No. 626,406. Patented June 6, 1899.
J. L. BLISS.
ROTATOR FOR SHIPS' LOGS.
(Application filed Jan. 4, 1899.)
(No Model.)

Witnesses:—
George Barry Jr
Edward Vieser

Inventor:—
John L. Bliss
by attorneys

UNITED STATES PATENT OFFICE.

JOHN L. BLISS, OF NEW YORK, N. Y.

ROTATOR FOR SHIPS' LOGS.

SPECIFICATION forming part of Letters Patent No. 626,406, dated June 6, 1899.

Application filed January 4, 1899. Serial No. 701,128. (No model.)

*To all whom it may concern:*

Be it known that I, JOHN L. BLISS, a citizen of the United States, and a resident of New York, in the county of Kings and State of New York, have invented new and useful Improvements in Rotators for Ships' Logs, of which the following is a specification.

My invention relates to certain improvements in rotators for ships' logs, with the object in view of providing a connection between the rotator and the rotator-line at the forward end of the rotator, the said connection presenting a very smooth exterior, so as not to impede in any degree the ease with which the rotator is towed through the water.

A further object for thus embedding the bight of the line in the surface of the tapered end of the rotator is to present a smooth and continuous surface, which will effectually prevent the lodgment of grass, seaweed, and all other obstructions which give great trouble where eyes and knots are employed.

A further object is to provide a structure in which all of the rotator-line may be exposed to light and air when the rotator is not in use, so as to facilitate the quick drying of the line, and thereby prevent it from decaying.

With these ends in view my invention consists in a rotator having a tapered end, a hole extending transversely therethrough a distance from its point, and grooves leading from the opposite ends of the hole to the point, so that the bight of the rotator-line will not project beyond the surface of the tapered end.

A practical embodiment of my invention is represented in the accompanying drawings, in which—

Figure 1:
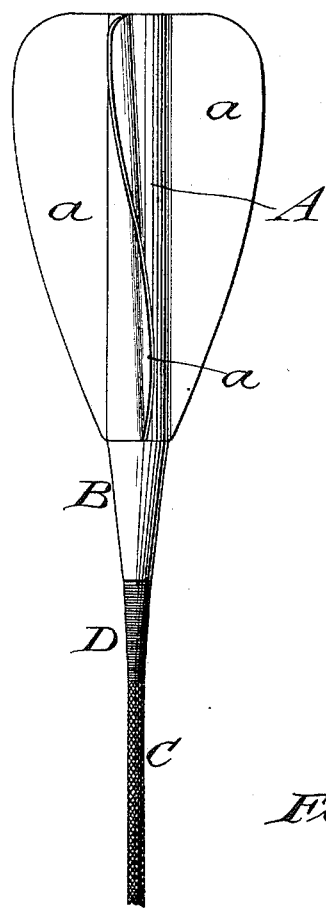
Figure 2:
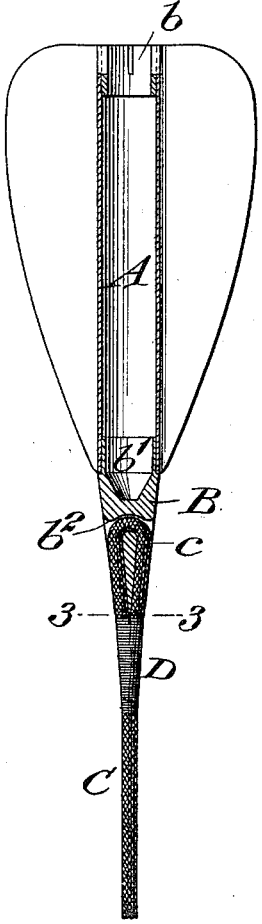
Figure 3:
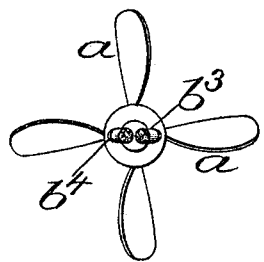

Figure 1 represents a plan view of my improved rotator and a portion of the rotator-line. Fig. 2 is a longitudinal central section through the same, and Fig. 3 is a transverse section taken in the plane of the line 3 3 of Fig. 2.

The rotator-tube is denoted by A, and it is provided with the usual blades or wings $a$ for imparting a rotary movement when the rotator is towed through the water. The tube A may be provided with a strengthening-sleeve $b$ at its rear end, if so desired. The forward end of the rotator is tapered, the taper in the present instance being formed upon a plug B, which is permanently secured to the front end of the tube A. The inner end of the plug B may be made hollow, as shown at $b'$, to lighten the construction somewhat.

The tapered end of the rotator is provided with a hole $b^2$, which extends transversely therethrough at a short distance to the rear of the point. A pair of grooves $b^3$ $b^4$ lead from the opposite ends of the transverse hole $b^2$ forwardly along the taper end B of the rotator to its point. The grooves $b^3$ $b^4$ and the hole $b^2$ are of sufficient size to receive the rotator-line C and prevent it from projecting beyond the surface of the tapered end.

The rotator-line C is secured to the rotator by passing its inner end through the transverse hole $b^2$, pressing the cord snugly into the grooves $b^3$ $b^4$, and then binding or serving the portion of the end of the line which projects beyond the point to the rotator-cord, as shown at D.

By the description hereinbefore set forth it will be seen that the rotator is connected to the rotator-cord near the forward end of the rotator, and yet no knot or projection is presented to impede the even movement of the rotator through the water when in use. Furthermore, it will be seen that the cord is entirely exposed in this arrangement, thereby permitting it to be dried very rapidly when exposed to the air and increasing the life of the cord.

It is evident that slight changes might be resorted to in the form and arrangement of the several parts without departing from the spirit and scope of my invention. Hence I do not wish to limit myself strictly to the structure herein set forth; but

What I claim is—

A rotator having a tapered end and a hole extending transversely therethrough a distance from its point and grooves leading from the opposite ends of the hole to the point, substantially as set forth.

In testimony that I claim the foregoing as my invention I have signed my name, in presence of two witnesses, this 29th day of December, 1898.

JOHN L. BLISS.

Witnesses:
 FREDK. HAYNES,
 GEORGE BARRY, Jr.